(12) United States Patent
Chard et al.

(10) Patent No.: US 8,581,629 B1
(45) Date of Patent: Nov. 12, 2013

(54) SYNCHRONOUS STATE MACHINE WITH AN APERIODIC CLOCK

(75) Inventors: Gary F. Chard, Garland, TX (US);
Scott A. Morrison, Richardson, TX (US); Susan A. Curtis, Sherman, TX (US); Daniel A. King, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/473,715

(22) Filed: May 17, 2012

(51) Int. Cl.
*H03K 19/0175* (2006.01)
(52) U.S. Cl.
USPC ............ 326/82; 326/93; 326/95; 326/26; 327/415
(58) Field of Classification Search
USPC ............ 326/82, 93, 95–98, 26–28; 327/199, 327/415, 416
See application file for complete search history.

(56) References Cited

U.S. PATENT DOCUMENTS 6,614,294 B1 * 9/2003 Walden .................. 327/558

* cited by examiner

*Primary Examiner* — Daniel D Chang
(74) *Attorney, Agent, or Firm* — Alan A. R. Cooper; W. James Brady, III; Frederick J. Telecky, Jr.

(57) ABSTRACT

An apparatus is provided. The apparatus includes an analog timing controller and a digital state machine. An input circuit in the digital state machine is configured to receive a plurality of analog input signals, and an analog event circuit is coupled to the analog timing circuit, the glitch filter, and the input circuit. The analog event circuit and input circuit are configured to generate a composite event signal from the analog input signals and by using the analog timing circuit. The glitch filter is configured to receive the composite event signal. A clock generator also is coupled to the glitch filter, wherein the clock generator is configured to generate an aperiodic clock signal. The aperiodic clock signal is configured to be a synchronous clock signal for the digital state machine.

19 Claims, 5 Drawing Sheets

SYNCHRONOUS STATE MACHINE WITH AN APERIODIC CLOCK

TECHNICAL FIELD

The invention relates generally to a state machine and, more particularly, to a synchronous state machine with an aperiodic clock.

BACKGROUND

Boost converters are used in a wide variety of conventional applications, and an example of a conventional boost converter 100 can be seen. As shown, the controller 102 is able to control transistors Q1 and Q2 (through driver 104) so as to generate an output voltage and current at node OUT from an input voltage and current at node IN. The combination of the inductor L1 and capacitor C1 (arranged as shown) enable a high voltage to be output node as compared to the voltage at node IN. The current sensor 106, error amplifiers 110 and 108, and voltage divider (which is generally comprised of resistors R1 and R2) can then be used to generate feedback to allow the controller 102 to adjust the pulse widths of the signals applied to transistors Q1 and Q2 to achieve the desired current and voltage at node OUT.

One problem with this configuration, however, is that the controller 102 is typically an asynchronous state machine. Asynchronous state machines are usually complex and difficult to design. Moreover, asynchronous state machines can be very sensitive to its inputs, leading (potentially) to metastable states. Therefore, there is a need for an improved state machine.

SUMMARY

The present invention, accordingly, provides an apparatus. The apparatus comprises an analog timing controller having an analog timing circuit and a glitch filter; and a digital state machine having: an input circuit that is configured to receive a plurality of analog input signals; an analog event circuit that is coupled to the analog timing circuit, the glitch filter, and the input circuit, wherein the analog event circuit and input circuit are configured to generate a composite event signal from the analog input signals and by using the analog timing circuit, and wherein the glitch filter is configured to receive the composite event signal; and a clock generator that is coupled to the glitch filter, wherein the clock generator is configured to generate an aperiodic clock signal, and wherein the aperiodic clock signal is configured to be a synchronous clock signal for the digital state machine.

In accordance with the present invention, the glitch filter further comprises: an input buffer that is coupled to the analog event circuit; a filter that is coupled to the input buffer; a Schmitt trigger that is coupled to the filter; and an output buffer that is coupled to the Schmitt trigger.

In accordance with the present invention, the clock generator further comprises: a flip-flop that is coupled to the output buffer; a delay circuit that is coupled to the flip-flop; and a logic circuit that is coupled to between the delay circuit and the flip-flop.

In accordance with the present invention, the analog timing circuit further comprises a plurality of analog timers.

In accordance with the present invention, the digital state machine further comprises an enable circuit that is configured to generate a POR signal.

In accordance with the present invention, the flip-flop further comprises a D flip-flop.

In accordance with the present invention, the logic circuit that is an OR gate coupled to the delay circuit and that is coupled to the enable circuit so as to receive the POR signal.

In accordance with the present invention, an apparatus is provided. The apparatus comprises a switching network; an inductor that is coupled to the switching network; a detection circuit that is coupled to the switching network; a driver that is coupled to the switching network; and a controller having: an analog timing controller having an analog timing circuit and a glitch filter; and a digital state machine having: an input circuit that is coupled to the detection circuit; an analog event circuit that is coupled to the analog timing circuit, the glitch filter, and the input circuit, wherein the analog event circuit and input circuit are configured to generate a composite event signal from an output of the detection circuit and by using the analog timing circuit, and wherein the glitch filter is configured to receive the composite event signal; and a clock generator that is coupled to the glitch filter, wherein the clock generator is configured to generate an aperiodic clock signal, and wherein the aperiodic clock signal is configured to be a synchronous clock signal for the digital state machine.

In accordance with the present invention, an apparatus is provided. The apparatus comprises a switching network having: a first switching node; a first output node; a second switching node; a second output node; a first MOS transistor that is coupled to the first switching node at its drain; a second MOS transistor that is coupled to first output node at its source and the first switching node at its drain; a third MOS transistor that is coupled to the second switching node at its source and the second output node at its drain; and a fourth MOS transistor that is coupled to second output node at its source; an inductor that is coupled between the first and second switching nodes; a detection circuit having: a first comparator that is coupled across the first MOS transistor; a second comparator that is coupled across the fourth transistor; a first error amplifier that is coupled to the first output node and that is configured to receive a first reference signal; and a second error amplifier that is coupled to the second output node and that is configured to receive a second reference signal; a driver that is coupled to the gates of the first, second, third, and fourth MOS transistors; and a controller having: an analog timing controller having: an analog timing circuit with a plurality of analog timers; and a glitch filter; and a digital state machine having: an input circuit that is coupled to the first comparator, the second comparator, the first error amplifier, and the second error amplifier; an analog event circuit that is coupled to the analog timing circuit, the glitch filter, and the input circuit, wherein the analog event circuit and input circuit are configured to generate a composite event signal from outputs from the first comparator, the second comparator, the first error amplifier, and the second error amplifier and by using the analog timing circuit, and wherein the glitch filter is configured to receive the composite event signal; a clock generator that is coupled to the glitch filter, wherein the clock generator is configured to generate an aperiodic clock signal, and wherein the aperiodic clock signal is configured to be a synchronous clock signal for the digital state machine; and control circuitry that is coupled to the first comparator, the second comparator, and the driver.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
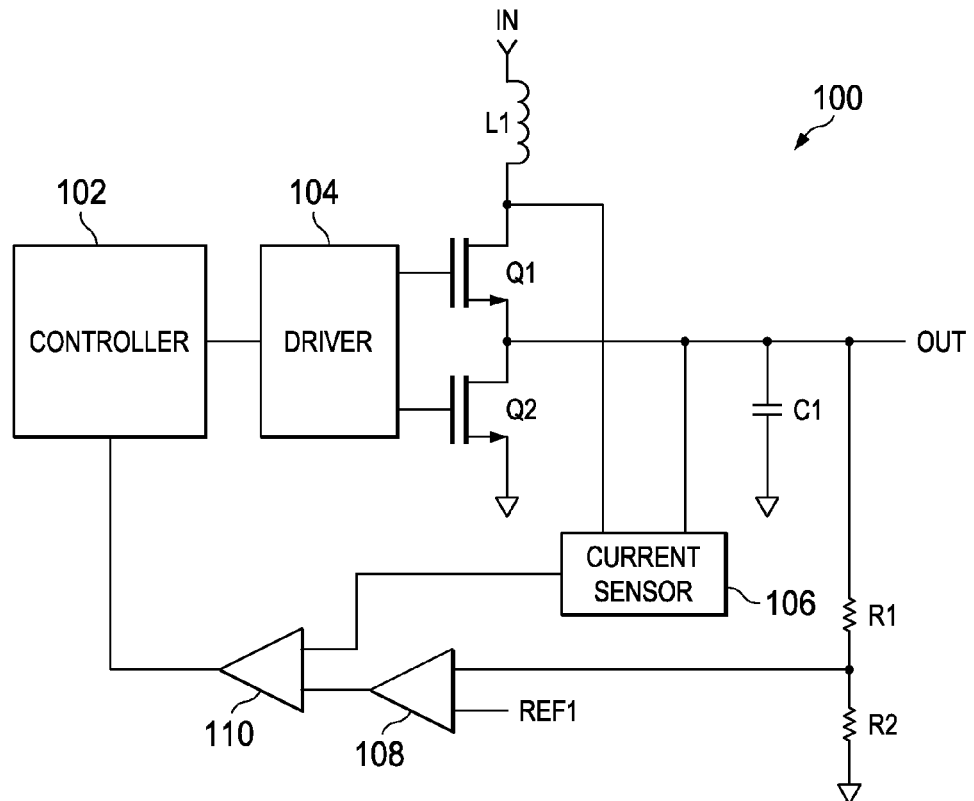
FIG. 1 is a diagram of an example of a conventional boost converter employing an asynchronous state machine.

Refer now to the drawings wherein depicted elements are, for the sake of clarity, not necessarily shown to scale and wherein like or similar elements are designated by the same reference numeral through the several views.

Turning to FIGS. 2-5, an example of a SIMO boost converter 200 in accordance with an embodiment of the present invention can be seen. As shown, the converter 200 is able to provide multiple output voltages (and currents) while using inductor L2, which are provided at output terminals or nodes OUTL and OUTH from the input voltage (at current) at terminal or node IN by way of a switching network (which can, for example, be generally comprised of transistors Q3 to Q6). For example, the voltage at terminal IN can be 5.7V, and the voltages at nodes OUTL and OUTH can, for example, be positive and negative rail voltages. To accomplish this, the inductor L2 (which can be coupled to switching nodes within the switch network) can be charged in a charge phase or mode, where transistors Q3 and Q6 are activated. Following the charge phase, transistors Q3 and Q5 can be activated in a high boost phase to generate the voltage (and current) at terminal OUTH and to charge capacitor C2 or transistors Q4 and Q6 can be activated in a low boost phase to generate the voltage (and current) at terminal OUTL and to charge capacitor C3.

Typically, pulse width modulated (PWM) signals are provided from drivers 204-1 and 204-2 to the gates of transistors Q3 to Q6 (which, for example, can be MOS transistors) to generate the voltages (and currents) at terminals OUTH and OUTL, and the pulse widths of the PWM signals are determined by the controller 202. The controller 202 generally comprises a digital state machine 302 and an analog timing circuit 304. The pulse widths can be determined based at least in part on output signals ERN, ERP, RCTP, and RCTN from the detection circuit (which can, for example, be generally comprised of comparators 208-1 and 208-2 and error amplifiers 210-1 and 210-2). Signals ERN, ERP, RCTP, and RCTN are typically analog signals and are received by the input circuit 312 (which typically samples the analog signals ERN, ERP, RCTP, and RCTN on the rising edge of aperiodic clock signal VCLK). The digital state machine 302 can then process the sampled signals after the next following falling edge of the aperiodic clock signal VCLK, effectively decoupling the noisy analog signals ERN, ERP, RCTP, and RCTN from the state machine 302 and its transitions to increase metastability hardening. The comparators 208-1 and 208-2 can generally function as rectifier comparators that can generate an output based on the difference between the drain and source voltages of transistors Q3 and Q6 (respectively), as reflected by signals RCTP and RCTN (respectively), and comparators 208-1 and 208-2 can be activated or deactivated by signals ST1 and ST2 (respectively) from state output circuit 308 based on the state of the controller 202. The error amplifiers 210-1 and 210-2 (which respectively receive reference signals REF2 and REF3) can determine errors in the voltages on terminals OUTL and OUTH that can indicate errors that can cause the controller 202 (through the FET controller 306 and signals Q3D, Q4D, Q5D, and Q6D) to adjust the pulse widths of the PWM signals provided to the gates of transistors Q3 to Q6.

Controller 202, however, is not an asynchronous state machine; instead, the timing controller 304 and timing interface 304 collectively provide an aperiodic clock signal VCLK to allow the controller 202 to operate as a synchronous state machine as indicated above. As shown in this example, the timer interface 314 is generally comprised of an analog event circuit 313 and a clock generator 316. The analog event circuit 313 can, for example, be a logic circuit that determines when to enter and exit particular states, and based at least in part on the signals ERN, ERP, RCTP, and RCTN (which, as shown, are received by the input circuit 312) and power-on reset (POR) signal (which itself can be based on enable signal EN), the analog event circuit 313 and the timing circuit 316 (which can include one or more analog resistor-capacitor (RC) timers) can generate composite event signal CE. For example, the rising edges signals RCTP and RCTN can be, in part, used to generate the composite event signal CE. Typically, the analog event circuit 313 and timing circuit 316 can be coupled together with a bus that can include one or more analog lines. This composite event signal CE can then be received by the buffer 402 in the glitch filter 318. The output from buffer 402 can then be filtered by filter 404 (which can, for example, be comprised of transistors Q7 and Q8, resistor R, and capacitor C4), and the filtered output can be used by the Schmitt trigger 406 (which can, for example, be generally comprised of transistors Q9 to Q15) and buffer 408 to generate signal CEF. This signal CEF can then be provided to the flip-flop 502 (which can for example be a D-type flip-flop) to generate the aperiodic clock signal VCLK.). Essentially, the analog event circuit 313 and timing circuit 316 can use glitchy and noisy analog signals ERN, ERP, RCTP, and RCTN to generate a signal (composite event signal CE) that can be used to generate a clock signal (aperiodic clock signal VCLK). Also, because the glitch filter 318 can, for example, ensure a minimum high time of the signal and can ensure a minimum output assertion time, the flip-flop 502 should not have a clock duty cycle pulse width violation and the aperiodic clock signal should be prevented from going entering a metastable state. Flip-flop 502 is then reset by the output of the OR gate 506 (which receives an output from the delay circuit 504 and the POR signal from the enable circuit 310. The digital state machine 302 may also include hardware interlock mechanisms (which can, for example, be part of the timer interface 314) that can assist in preventing re-arming of timers until all desired state transitions and timer resets have occurred. The timer interface 314 may also include a watchdog timer that can expire when: (a) a particular state is held for too long or is deemed to be a stuck state; (2) an illegal combination of state or logic signals exists for too long; (3) the composite event signal is asserted for too long which might indicate that the clock generation failed to receive the analog event circuit 313; or (4) other condition which would be deemed an error condition or hazardous combination of signals or events or lack thereof.

Figure 6:
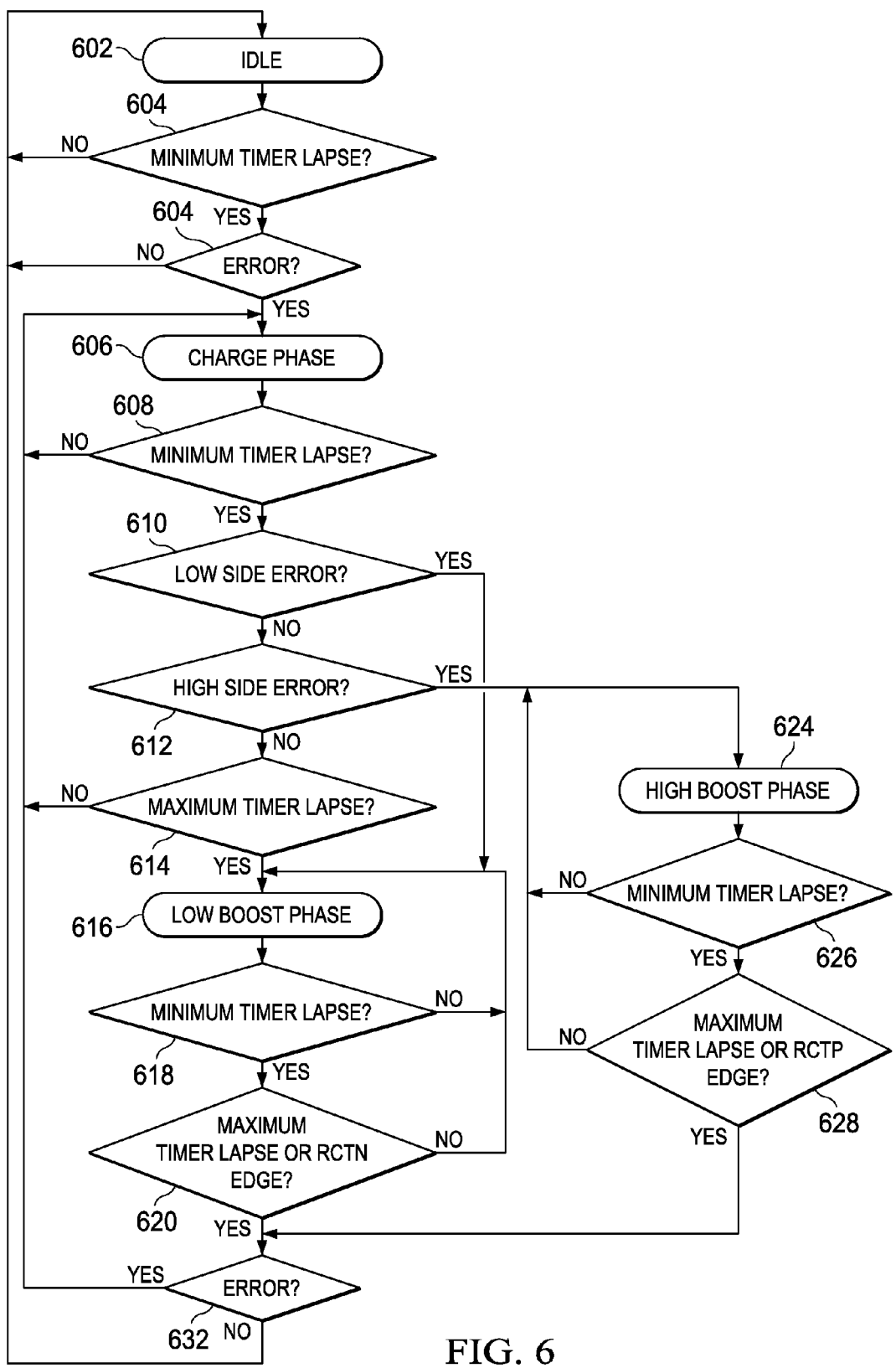
FIG. 6 is a diagram of an example of a state diagram for the controller of FIG. 3.

Turning now to FIG. 6, a state diagram for the controller 202 (which is operating as a synchronous state machine using the aperiodic clock signal VCLK) can be seen. Initially, the controller 202 is in an idle state 602 until the minimum timer (which can be included as part of the timer interface 314 and which can for example be about 100 ns) lapses in state 604 and an error in the voltages for terminals OUTH and OUTL is detected in stat 604. Once an error is detected, the charge phase (an example of which is described above) is entered in state 606, remaining in this phase until the minimum timer (which can for example be about 200 ns). If there is a low side error (i.e., from error amplifier 202-1) is detected in state 610), the controller 202 enters the boost converter 200 into the low boost phase (where the signal ST2 enables comparator 208-2) in state 616 for the duration of the minimum timer (i.e., about 100 ns) in state 618. The boost converter 200 can then remain in the low boost phase until (as shown in state 620) the maximum timer (i.e., about 2 µs) has lapsed or that an edge of signal RCTN is detected. When either of these events occur, a determination is made in state 632 as to whether an error (i.e., signal ERN and/or ERP indicate an error) exists so as to allow the boost converter 200 to reenter the charge phase in state 606 if an error does exist or to the idle state 602 if no error is present. If there is no low side error in state 610, a determination is made in state 612 as to whether a high side error exists (i.e., signal ERP indicates an error). When a high side error is present, the controller 202 enters the boost converter 200 into the high boost phase (where the signal ST1 enables comparator 208-1) in state 624 for the duration of the minimum timer (i.e., about 100 ns) in state 626. The boost converter 200 can then remain in the high boost phase until (in state 628) the maximum timer (i.e., about 2 µs) has lapsed or that an edge of signal RCTP is detected. When either of these events occur, a determination is made in state 632 as to whether an error (i.e., signal ERN and/or ERP indicate an error) exists so as to allow the boost converter 200 to reenter the charge phase in state 606 if an error does exist or to the idle state 602 if no error is present. Finally, if no high side error is detected in state 612, the boost converter 200 can remain in the charge phase until the maximum timer (i.e., about 1 µs) lapses.

There may also be conditions where an error simultaneously occurs on both terminals OUTL and OUTH. Under these types of conditions, the controller 202 can enter an indeterminate state, effectively being trapped between states 610 and 612. To compensate for such a condition, the digital state machine 302 includes an arbitration mechanism (which can, for example, be included within the state output circuit 308). The arbitration mechanism maintains a record for which terminal (i.e., OUTL or OUTH) was last serviced, and, when errors occur simultaneously (or substantially simultaneously) on both terminals OUTL and OUTH, the arbitration directs the digital state machine 302 to select the terminal OUTH or OUTL that was not serviced during the previous loop. Alternatively, other fairness arbitration methods (such as a 50% arbitration mechanism) may also be employed.

Figure 7:
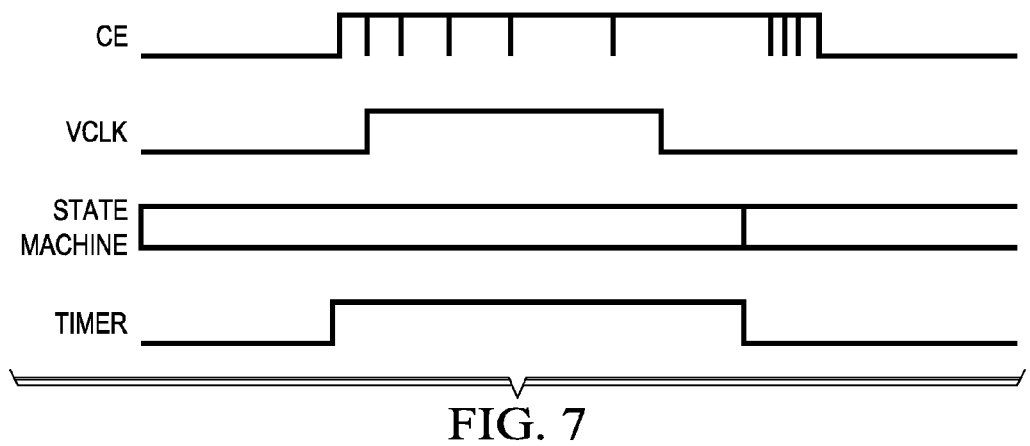
FIG. 7 is an example timing diagram depicting an example operation of the controller of FIGS. 2 and 3.
Figure 2:
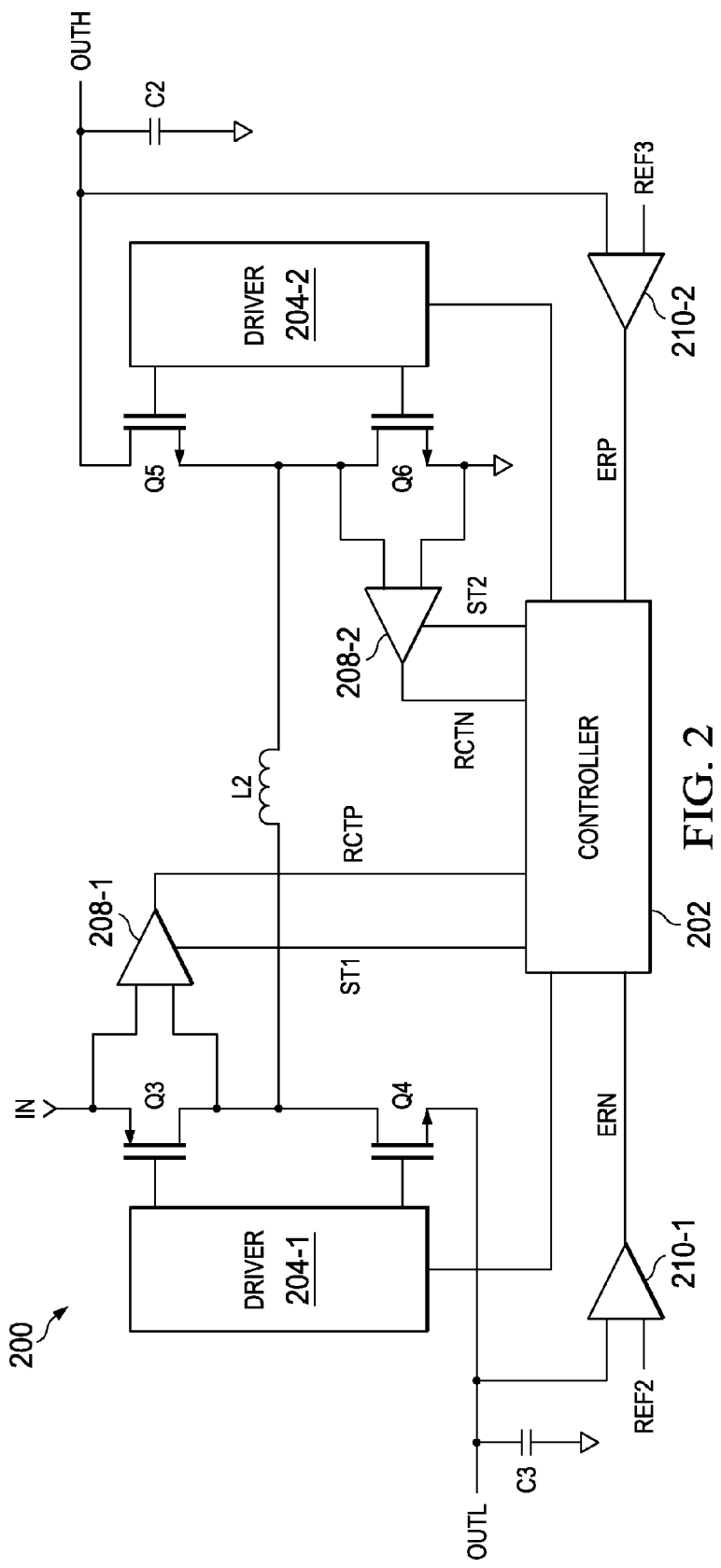
FIG. 2 is a diagram of an example of a single output multiple output (SIMO) boost converter in accordance with an embodiment of the present invention.
Figure 3:
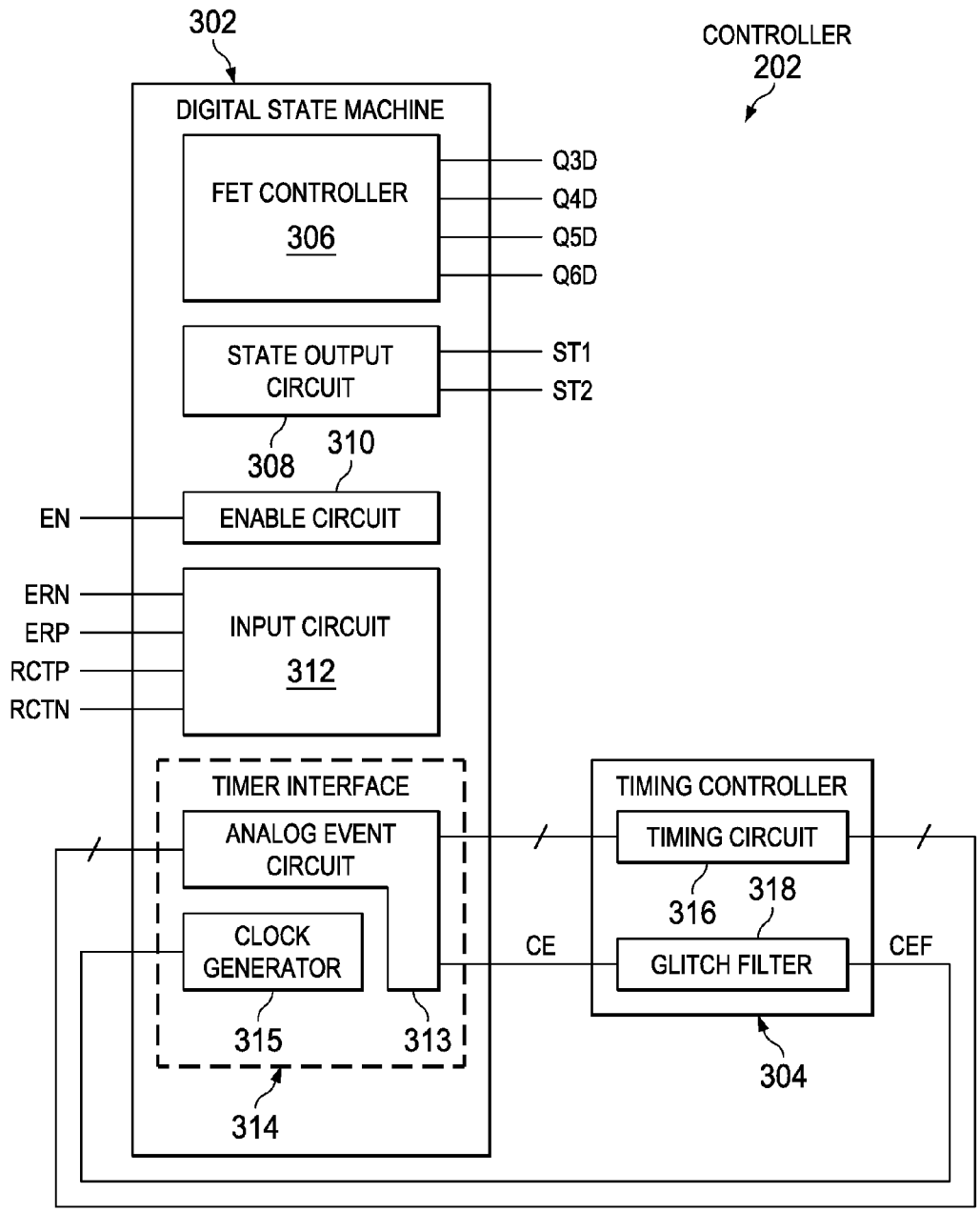
FIG. 3 is a diagram of an example of the controller of the boost converter of FIG. 2.
Figure 4:
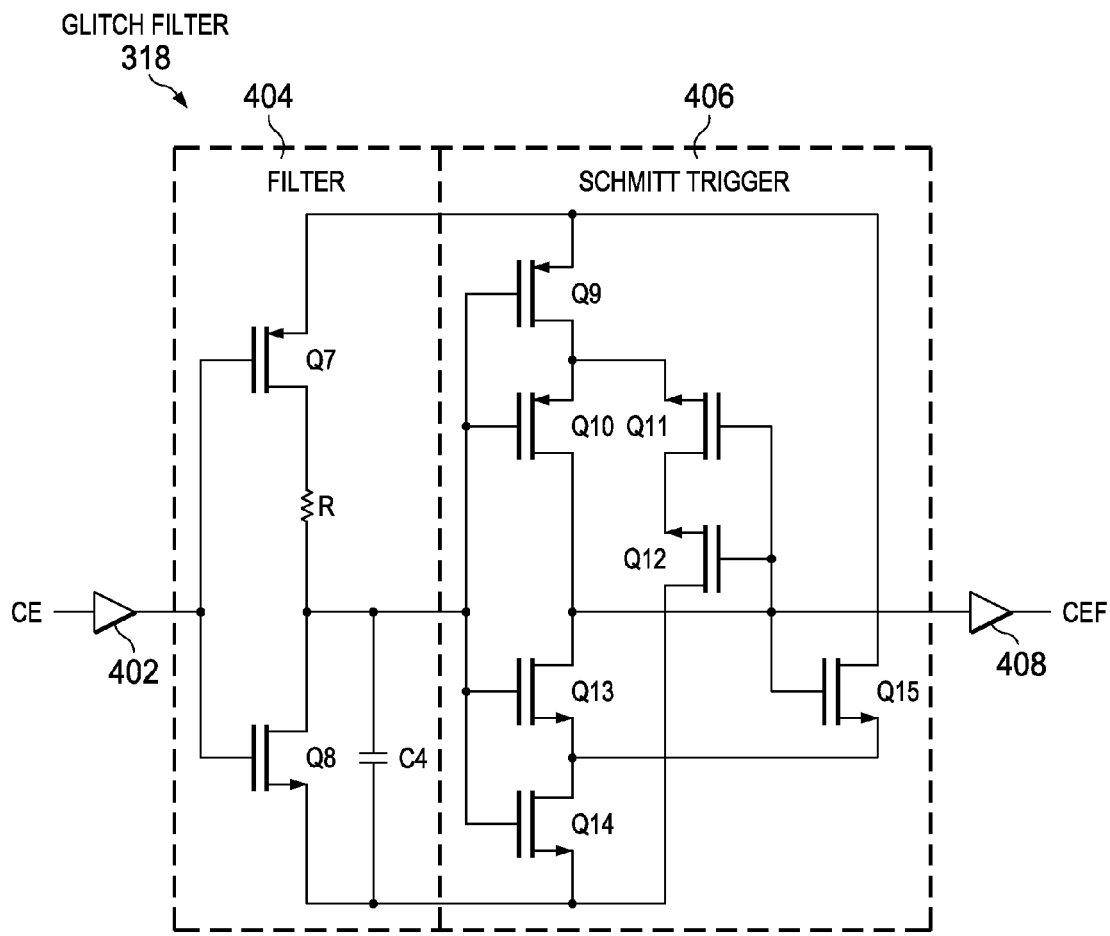
FIG. 4 is a diagram of an example of the glitch filter of FIG. 3.
Figure 5:
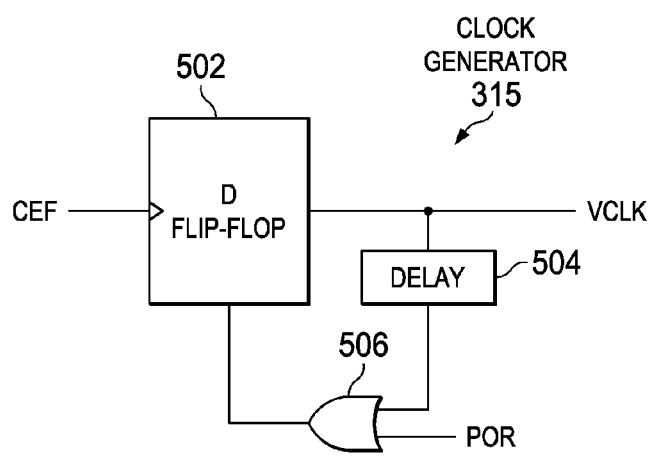
FIG. 5 is a diagram of an example of the clock generator of FIG. 3.

As should be apparent from the state diagram of FIG. 6, the composite event signal CE can be trigger based on a variety of events (such as an edge of signal RCTP and/or RCTN or the lapsing of a timer set by timing circuit 316). As shown in FIG. 7, the glitch filter 318 is able to de-glitch the signal CE to help prevent undesired switching, and the aperiodic clock VCLK can be generated accordingly. Thus, the use of a more stable and easily designed synchronous state machine (i.e., controller 202) can be used as part of boost converter 200 instead of an asynchronous state machine.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
    an analog timing controller having an analog timing circuit and a glitch filter; and
    a digital state machine having:
        an input circuit that is configured to receive a plurality of analog input signals;
        an analog event circuit that is coupled to the analog timing circuit, the glitch filter, and the input circuit, wherein the analog event circuit and input circuit are configured to generate a composite event signal from the analog input signals and by using the analog timing circuit, and wherein the glitch filter is configured to receive the composite event signal; and
        a clock generator that is coupled to the glitch filter, wherein the clock generator is configured to generate an aperiodic clock signal, and wherein the aperiodic clock signal is configured to be a synchronous clock signal for the digital state machine,
    wherein the glitch filter further comprises:
        an input buffer that is coupled to the analog event circuit;
        a filter that is coupled to the input buffer;
        a Schmitt trigger that is coupled to the filter; and
        an output buffer that is coupled to the Schmitt trigger.

2. The apparatus of claim 1, wherein the clock generator further comprises:
    a flip-flop that is coupled to the output buffer;
    a delay circuit that is coupled to the flip-flop; and
    a logic circuit that is coupled to between the delay circuit and the flip-flop.

3. The apparatus of claim 2, wherein the analog timing circuit further comprises a plurality of analog timers.

4. The apparatus of claim 3, wherein the digital state machine further comprises an enable circuit that is configured to generate a POR signal.

5. The apparatus of claim 4, wherein the flip-flop further comprise a D flip-flop.

6. The apparatus of claim 5, wherein the logic circuit that is an OR gate coupled to the delay circuit and that is coupled to the enable circuit so as to receive the POR signal.

7. An apparatus comprising:
    a switching network;
    an inductor that is coupled to the switching network;
    a detection circuit that is coupled to the switching network;
    a driver that is coupled to the switching network; and
    a controller having:
        an analog timing controller having an analog timing circuit and a glitch filter; and
        a digital state machine having:
            an input circuit that is coupled to the detection circuit;
            an analog event circuit that is coupled to the analog timing circuit, the glitch filter, and the input circuit, wherein the analog event circuit and input circuit are configured to generate a composite event signal from an output of the detection circuit and by using the analog timing circuit, and wherein the glitch filter is configured to receive the composite event signal; and
            a clock generator that is coupled to the glitch filter, wherein the clock generator is configured to generate an aperiodic clock signal, and wherein the aperiodic clock signal is configured to be a synchronous clock signal for the digital state machine.

8. The apparatus of claim 7, wherein the glitch filter further comprises:
an input buffer that is coupled to the analog event circuit;
a filter that is coupled to the input buffer;
a Schmitt trigger that is coupled to the filter; and
an output buffer that is coupled to the Schmitt trigger.

9. The apparatus of claim 8, wherein the clock generator further comprises:
a flip-flop that is coupled to the output buffer;
a delay circuit that is coupled to the flip-flop; and
a logic circuit that is coupled to between the delay circuit and the flip-flop.

10. The apparatus of claim 9, wherein the analog timing circuit further comprises a plurality of analog timers.

11. The apparatus of claim 10, wherein the digital state machine further comprises an enable circuit that is configured to generate a power-on-reset (POR) signal.

12. The apparatus of claim 11, wherein the flip-flop further comprise a D flip-flop.

13. The apparatus of claim 12, wherein the logic circuit that is an OR gate coupled to the delay circuit and that is coupled to the enable circuit so as to receive the POR signal.

14. An apparatus comprising:
a switching network having:
a first switching node;
a first output node;
a second switching node;
a second output node;
a first MOS transistor that is coupled to the first switching node at its drain;
a second MOS transistor that is coupled to first output node at its source and the first switching node at its drain;
a third MOS transistor that is coupled to the second switching node at its source and the second output node at its drain; and
a fourth MOS transistor that is coupled to second output node at its source;
an inductor that is coupled between the first and second switching nodes;
a detection circuit having:
a first comparator that is coupled across the first MOS transistor;
a second comparator that is coupled across the fourth transistor;
a first error amplifier that is coupled to the first output node and that is configured to receive a first reference signal; and
a second error amplifier that is coupled to the second output node and that is configured to receive a second reference signal;

a driver that is coupled to the gates of the first, second, third, and fourth MOS transistors; and
a controller having:
an analog timing controller having:
an analog timing circuit with a plurality of analog timers; and
a glitch filter; and
a digital state machine having:
an input circuit that is coupled to the first comparator, the second comparator, the first error amplifier, and the second error amplifier;
an analog event circuit that is coupled to the analog timing circuit, the glitch filter, and the input circuit, wherein the analog event circuit and input circuit are configured to generate a composite event signal from outputs from the first comparator, the second comparator, the first error amplifier, and the second error amplifier and by using the analog timing circuit, and wherein the glitch filter is configured to receive the composite event signal;
a clock generator that is coupled to the glitch filter, wherein the clock generator is configured to generate an aperiodic clock signal, and wherein the aperiodic clock signal is configured to be a synchronous clock signal for the digital state machine; and
control circuitry that is coupled to the first comparator, the second comparator, and the driver.

15. The apparatus of claim 14, wherein the glitch filter further comprises:
an input buffer that is coupled to the analog event circuit;
a filter that is coupled to the input buffer;
a Schmitt trigger that is coupled to the filter; and
an output buffer that is coupled to the Schmitt trigger.

16. The apparatus of claim 15, wherein the clock generator further comprises:
a flip-flop that is coupled to the output buffer;
a delay circuit that is coupled to the flip-flop; and
a logic circuit that is coupled to between the delay circuit and the flip-flop.

17. The apparatus of claim 16, wherein the digital state machine further comprises an enable circuit that is configured to generate a POR signal.

18. The apparatus of claim 17, wherein the flip-flop further comprise a D flip-flop.

19. The apparatus of claim 18, wherein the logic circuit that is an OR gate coupled to the delay circuit and that is coupled to the enable circuit so as to receive the POR signal.

* * * * *